(No Model.)

J. HAS BROUCK.
SYRINGE.

No. 539,514. Patented May 21, 1895.

Witnesses:
John W. Fisher
Grace T. Many

Inventor,
Josiah Has Brouck.
by Ward & Cameron,
Attorneys.

UNITED STATES PATENT OFFICE.

JOSIAH HAS BROUCK, OF PORT EWEN, NEW YORK.

SYRINGE.

SPECIFICATION forming part of Letters Patent No. 539,514, dated May 21, 1895.

Application filed January 21, 1895. Serial No. 535,634. (No model.)

*To all whom it may concern:*

Be it known that I, JOSIAH HAS BROUCK, a citizen of the United States, residing at the village of Port Ewen, county of Ulster, State of New York, have invented a new and useful Syringe or Injection-Tube, of which the following is a specification.

My invention relates to surgical apparatus; and the object of my invention is to provide a receptacle for medicinal substances, so constructed that a portion of the vessel may be inserted into an orifice of the body and the contents thereof forcibly injected into said orifice. I attain this object by means of the mechanism illustrated in the accompanying drawings, in which—

Figure 1:
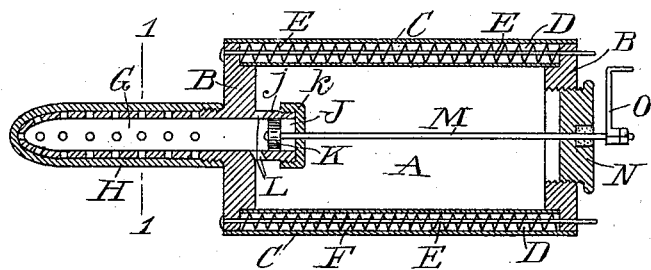
Figure 2:
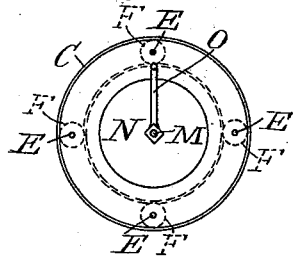
Figure 3:

Figure 1 is a longitudinal section. Fig. 2 is an end elevation, and Fig. 3 is a section along the line 1 1 on Fig. 1.

Similar letters refer to similar parts throughout the several views.

A is a tube provided with ends B B constructed of gutta-percha, glass, or any solid substance, the sides C of said tube being of canvas, felt, or other substance which may be compressed without injury. Along the sides C on the tube A, at suitable intervals, I arrange sacks D through which I place a wire or rod E, which rod E is secured at each end by the ends of the tube. Above the rod E and having a seat in the ends B B of the tube, I place a spiral spring F arranged in such a manner that the ends of the tube may be brought toward each other against the resiliency of said springs. I have shown four rods and springs, (see Fig. 2,) but more or less may be used as desired. To one end of the tube, I secure a perforated nozzle G in any suitable manner, and I also arrange a cap H for the purpose of covering the nozzle G when the instrument is not in use. To the end of the tube to which the nozzle is secured and projecting into the tube therefrom, I arrange a piston chamber J by securing a pipe *j* to the end B of the tube, which pipe is threaded near one end and provided with a cap *k*. I arrange a series of openings L in the pipe *j* allowing the fluid to pass from the tube A into the nozzle G. Within the piston chamber J, I arrange the piston head K secured to the piston rod M; the piston rod M extending through the stopper N in the end of the tube opposite the nozzle, and to the end of the piston rod M, I arrange a crank arm O. The stopper N is arranged to screw into the end B of the tube A, as shown in Fig. 1.

The operation of my invention is apparent. The tube is filled by removing the stopper N after taking off the crank arm O and the nozzle having been inserted into the desired orifice, the contents are forced from the tube into the nozzle through the openings L by pressing the ends of the tube toward each other, and when a sufficient quantity has entered the nozzle, by operating the piston M, the contents of the nozzle will be forced abruptly into the orifice. By means of the crank arm O, the contents of the nozzle may be agitated.

What I claim as my invention, and desire to secure by Letters Patent, is—

In a collapsible tube for a syringe, the combination of a series of springs arranged longitudinally therein, a perforated nozzle secured to one end thereof, a piston chamber communicating with said nozzle, a piston arranged to operate within said nozzle and said piston chamber, a piston rod extending through said tube, all so arranged that when the ends of the tube are brought toward each other against the tension of said springs, the contents of the tube will be forced into the nozzle and, by operating the piston, will be discharged from the nozzle through the perforations, substantially as described and for the purpose set forth.

JOSIAH HAS BROUCK.

Witnesses:
P. A. SCHRYVER,
ALBERT MUNSON.